US009697255B2

(12) United States Patent
Schöning

(10) Patent No.: US 9,697,255 B2
(45) Date of Patent: Jul. 4, 2017

(54) SYSTEMS AND/OR METHODS FOR INTRODUCING SEMANTIC CONCEPTS INTO COMPLEX EVENT PROCESSING ENVIRONMENTS

(75) Inventor: Harald Schöning, Dieburg (DE)

(73) Assignee: SOFTWARE AG, Darmstadt (DE)

( * ) Notice: Subject to any disclaimer, the term of this patent is extended or adjusted under 35 U.S.C. 154(b) by 520 days.

(21) Appl. No.: 13/553,227

(22) Filed: Jul. 19, 2012

(65) Prior Publication Data
US 2014/0025700 A1 Jan. 23, 2014

(51) Int. Cl.
*G06F 7/00* (2006.01)
*G06F 17/30* (2006.01)

(52) U.S. Cl.
CPC .. *G06F 17/30516* (2013.01); *G06F 17/30389* (2013.01); *G06F 17/30684* (2013.01); *G06F 17/30734* (2013.01)

(58) Field of Classification Search
CPC ......... G06F 17/30516; G06F 17/30389; G06F 17/30734; G06F 17/2785; G06F 17/30477; G06F 9/542; G06F 17/30424; G06F 17/30463; G06F 17/30684; G06F 17/30427; G06F 17/2872; G06F 21/554; G06F 2201/86; G06Q 10/067; G06N 5/02
USPC .......... 705/7.11–7.42; 707/E17.07, E17.074, 707/E17.098, E17.099, 739, 759, 760, 707/763, 771
See application file for complete search history.

(56) References Cited

U.S. PATENT DOCUMENTS

2010/0185643 A1* 7/2010 Rao ................... G06F 17/30389
707/759
2013/0198117 A1* 8/2013 Upadhyaya et al. .......... 706/12

FOREIGN PATENT DOCUMENTS

| AU | WO2012/034187 A1 * | 9/2011 | |
| AU | WO 2012/034187 A1 * | 3/2012 | ............. G06F 17/00 |
| WO | WO 2012/034187 | 3/2012 | |

OTHER PUBLICATIONS

J. Calbimonte, et al., "Enabling Ontology-Based Access to Streaming Data Sources," ISWC, Part I, LNCS 6496, Nov. 7, 2010, pp. 96-111 (16 pp.).

(Continued)

*Primary Examiner* — Jason Liao
*Assistant Examiner* — Berhanu Mitiku
(74) *Attorney, Agent, or Firm* — Nixon & Vanderhye PC

(57) ABSTRACT

Certain example embodiments described herein relate to techniques for introducing semantic concepts into complex event processing (CEP) systems and/or methods. In an event processing system, for example, an event bus is configured to receive a stream of events, each having a predefined event type. An event processing agent is configured to execute predefined queries on the events, with each query conforming to a query language, and with the query language being enhanced via a semantic extension corresponding to an ontology. An ontology management component in communication with the event processing agent stores mappings (optionally specified at design time) between concepts of the query language and concepts of the ontology that enhances the query language. Processing resources of the component translate (optionally at compile time) references to ontology concepts into translated queries processable by the event processing agent in accordance with the query language, without the semantic extension enhancement.

35 Claims, 4 Drawing Sheets

(56) References Cited

OTHER PUBLICATIONS

D. Anicic, et al., "EP-SPARQL: A Unified Language for Event Processing and Stream Reasoning," WWW—Session: Query and Ontology Languages, Mar. 28-Apr. 1, 2011, pp. 635-644 (10 pp.).
A. Bolles, et al., "Streaming SPARQL—Extending SPARQL to Process Data Streams," ESWC, LNCS 5021, 2008, pp. 448-462 (15 pp.).
D. Barbieri, et al., "Stream Reasoning: Where We Got So Far," Jan. 1, 2010, pp. 1-7 (7 pp.).
J. Krämer, et al., "Semantics and Implementation of Continuous Sliding Window Queries Over Data Streams," ACM Transactions on Database Systems, vol. 34, No. 1, Article 4, Apr. 2009, pp. 1-48 (48 pp.).
J. Krämer, et al., "Continuous Queries Over Data Streams—Semantics and Implementation," Jun. 2007 (314 pp.).
Ontology—Wikipedia, the Free Encyclopedia, retrieved Jul. 19, 2012. http://en.wikipedia.org/wiki/Ontology_%28information_science%29.
Event Processing Technical Society, Event Processing Glossary—Version 1.1, Jul. 2008, pp. 1-19. http://www.ep-ts.com/component/option,com_docman/task,doc_download/gid,66/Itemid,84/.
NASA—Semantic Web for Earth and Environmental Terminology (SWEET), retrieved Jul. 19, 2012. http://sweet.jpl.nasa.gov/ontology/.
The Open Biological and Biomedical Ontologies, retrieved Jul. 19, 2012. http://obofoundry.org/
Kathrin Prantner, "OnTour—The Ontology," retrieved Jul. 19, 2012. http://e-tourism.deri.at/ont/docu2004/OnTour%20-%20The%20Ontology.pdf.

* cited by examiner

SYSTEMS AND/OR METHODS FOR INTRODUCING SEMANTIC CONCEPTS INTO COMPLEX EVENT PROCESSING ENVIRONMENTS

TECHNICAL FIELD

Certain example embodiments described herein relate to complex event processing (CEP) systems and/or methods. More particularly, certain example embodiments relate to techniques for introducing semantic concepts into complex event processing (CEP) systems and/or methods.

BACKGROUND AND SUMMARY OF EXAMPLE EMBODIMENTS OF THE INVENTION

Stream processing typically follows the pattern of continuous queries, which may be thought of in some instances as being queries that execute for a potentially indefinite amount of time on data that can change very rapidly. Such rapidly changing data are called streams, and streams oftentimes comprise events. Such streams often exist in real-world scenarios, e.g., as temperature readings from sensors placed in warehouses or on trucks, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Possible events occurring in an environment typically are schematically described by so-called event types, which in some respects are somewhat comparable to table definitions in relational databases. Streams may in certain scenarios be organized in channels that in turn are implemented by an event bus. Channels and event types in this sense may be considered orthogonal concepts, e.g., in the sense that channels may comprise events of several event types, and events of the same event type might be communicated via different channels.

Events in corresponding data streams are typically used in computer systems adhering to the event-driven architecture (EDA) paradigm. In such systems, several computer applications each execute on distinct computer systems and are typically interconnected by a network, such as a local area network or even the Internet. Each application typically is in charge of executing a certain processing task, which represents a processing step in an overall process, and each application typically communicates with the other applications by exchanging events. Examples include the calculation of complex mathematical models (e.g., for weather forecasts or scientific computations) by a plurality of distributed computers, the control of an assembly line (e.g. for the manufacturing of a vehicle, wherein each assembly step is controlled by a particular application participating in the overall assembly process), etc. Generally, events may be represented in a variety of different formats. The XML format, for instance, is one common format in which events may be represented. For example, an event stating the current conditions of a machine by giving values for temperature and oil pressure could be represented in the following manner:

```
<MachineState>
    <header valid-from="20120511:10:59:00"
    valid-to="20120511:11:00:00"/>
    <payload>
```

-continued

```
        <temperature>165</temperature>
        <oilpressure>7</oilpressure>
        <powerconsumption>300</powerconsumption>
        <state>running</state>
    </payload>
</MachineState>
```

In a complex event processing (CEP) system, events may be evaluated and aggregated to form derived (or complex) events by so-called event processing agents. A typical manner to specify such evaluation and aggregation involves using CEP queries, which oftentimes are formulated in an SQL-like query language that is enhanced by some CEP-specific clauses such as, for example, a WINDOWS or RANGE clause to define conditions that relate to the occurrence of events within streams or channels. Typically, CEP systems are used to automatically trigger some activity, e.g., an appropriate reaction on an unusual situation that is reflected by the occurrence of some event patterns. The execution of such a reaction, however, typically lies outside of the CEP system. A common mechanism to trigger reactions includes having some agents listening for specific complex events on dedicated channels and executing the appropriate action when such an event is encountered.

FIG. 1 is a simplified schematic view of a typical CEP system and its environments. As shown in FIG. 1, an event bus 102 listens for events from, and publishes events to, one or more event processing agents 104, e.g., via one or more channels 106 provided to the event bus 102. Plural event processing agents 104a-n are listening for, and publishing events to, channels 106a-c in the FIG. 1 example. One or more agents 108 for executing actions also may listen to events from the event bus 102 via a suitable first channel 106a. Of course, it will be appreciated that the event bus 102 may have any number of channels 106 that listen for events from and/or publish events to any number of event processing agents 104, and/or may have any number of channels 106 that publish events to any number of agents for executing actions 108, in different implementations.

In contrast with database systems that run queries once a certain state of the data has been reached, CEP systems perform "continuous" query execution on streams, e.g., a query is "constantly" and "continuously" evaluated "forever." This approach allows CEP systems to spend much more effort on query optimization, as query compilation typically occurs only once, unless the query is modified. On the other hand, CEP systems could benefit from a mechanism for "hot redeployment" of queries to cope with changes in queries.

It is believed that in current applications using CEP systems, the application semantics (which may be thought of in some cases as the logic underlying a particular application, such as whether a given sequence of processing steps is considered correct or incorrect with respect to the intended application behavior) is coded into the CEP queries. For example, in an application area pertaining to production systems, CEP can be used to monitor the production and detect situations that need human attention or even automatic reactions. In this case, all situations that are considered critical would be expressed by corresponding expressions in the CEP queries. When the related situation is detected, such a query would generate an event that triggers an adequate reaction. For example, if a machine reports a blockage, the whole production chain should be stopped. A sample query to handle this could be the following:

```
SELECT 'StopProduction'
FROM MachineState ON CHANNEL MachineCondition
WHERE state='blocked';
```

This query assumes that a blockage is reported on channel MachineCondition and with an event type MachineState. If other channels exist that transport machine blockage events, these would be missed by the query. Also, machine blockages reported with a different event type would be missed.

Of course, there might be other conditions that should cause stop of production, e.g., gas leakages, etc. As a consequence, there might be another CEP Query such as:

```
SELECT 'StopProduction'
FROM SensorData ON CHANNEL Environment
WHERE gas>10;
```

Both queries could potentially be combined into a single one, e.g., as follows:

```
SELECT 'StopProduction'
FROM MachineState ON CHANNEL MachineCondition
WHERE state='blocked'
UNION
SELECT 'StopProduction'
FROM SensorData ON CHANNEL Environment
WHERE gas>10;
```

There is, however, no means other than programming discipline to guarantee that the queries are combined in such a way that the combination represents a meaningful semantics. For example, there is nothing that prevents combinations of production stop conditions with other conditions, such as in the following query:

```
SELECT 'StopProduction'
FROM MachineState ON CHANNEL MachineCondition
WHERE state='blocked' UNION
SELECT 'StartVentilation'
FROM SensorData ON CHANNEL Environment
WHERE gas>0;
```

Similar comments apply with respect to techniques for prevents typing errors (that may, for example, result in effectively missing a critical situation), e.g., as shown in the following query:

```
SELECT 'StopProduction'
FROM MachineState ON CHANNEL MachineCondition
WHERE state='blocked'
UNION
SELECT 'SopProduction'
FROM SensorData ON CHANNEL Environment
WHERE gas>10;
```

When more of these and/or other critical situations are to be monitored, relevant states are reported via an additional channel, additional event types are used to report relevant states, and/or the like, the queries generally have to be enhanced or modified. As a consequence, application semantics is scattered over many queries. It accordingly is hard to keep an overview of the semantics of the application. Furthermore, there is no reasonable means for verifying that all the necessary changes have been done (e.g., adding another channel might require changes in many queries) and whether they have been done correctly (e.g., spelling errors as shown before). This is particularly true when queries are more complex, e.g., as in the following query that triggers a maintenance request for a certain machine when the number of warning conditions (temperature too high, oil pressure low, system reset) within an hour is above a certain threshold (here, 5):

```
SELECT 'RequestMaintenance', machine FROM
    (SELECT COUNT(a.x) AS number, machine
    FROM (      SELECT machine
        FROM MachineState ON CHANNEL MachineCondition
        WHERE temperature > 100 or oilpressure < 10
        UNION
        SELECT machine
        FROM MachineEvents ON CHANNEL ProductionEvents
        WHERE eventtype='SystemReset')
    WINDOW(RANGE 1 HOUR)
    GROUP BY machine)
WHERE number > 5
```

The inventor has realized that one way to address such issues would involve employing an ontology in connection with CEP systems and/or methods. Ontologies are commonly used ways of modeling parts of the world by using semantic concepts. It is noted that some CEP systems have been based on taxonomies. Ontologies, however, are much more expressive than taxonomies, which at best only provide a strict hierarchical order of terms without any further semantics.

WO 2012/034187, which is hereby incorporated by reference herein in its entirety, describes a mechanism for defining CEP event types on the basis of an ontology such that, with suitable transformation specific to a CEP engine, the event processing can eventually be based on the ontology definition. This approach in some senses attempts to combine an ontology with CEP processing, relying on the ontology being the driving force to process events based on the ontology by a specific transformation for each CEP engine.

In contrast with the approach taken in WO '187, certain example embodiments involve separating the semantics from queries and allowing fast, easy, and transparent extension and change of the semantics without necessarily forcing any changes in the operative queries, while on the other hand being able to use the full query language expressiveness supported by the CEP engine.

The approaches employed by certain example embodiments advantageously do not require the creation of the initial event types or queries by an ontology. Indeed, one cannot reasonably expect to cover each functionality of a concrete CEP language when the starting point is at the ontology from which the CEP query will be generated. In marked contrast, certain example embodiments start with the full extent of the CEP query language and do not restrict it. In addition, given the approach taken by WO '187, it does not seem possible to dynamically correlate single events (for example, also by a third party or humans) with an ontology class.

As will be appreciated from the above, then, each CEP system usually provides its own version of some sort of query language, and these query languages have their common drawbacks with respect to specifying semantic criteria in a dynamic way. Certain example embodiments, by contrast, enrich a CEP query language with the power of an ontology, e.g., to define the semantics in more powerful and dynamic ways.

One aspect of certain example embodiments relates to the separation of the semantics and the operative CEP language. Using an ontology increases the flexibility and advantageously results in richer and easier usage of CEP systems.

Another aspect of certain example embodiments relates to the fact that because the end-result of the extension is not visible to the CEP engine, the usage may be independent of any particular CEP language. Instead, a pre-compile step may be provided to enable this further division.

In certain example embodiments, an event processing system is provided. An event bus is configured to receive a stream of events, with each said event having a predefined event type. An event processing agent includes at least one first processor and a memory. The event processing agent is configured to execute predefined queries on the events, with each said query conforming to a query language, and with the query language being enhanced via a semantic extension corresponding to an ontology. An ontology management component is in communication with the event processing agent. The ontology management includes a first storage location storing mappings (optionally specified at design time) between CEP concepts (e.g. events, channels, etc.) and concepts of the ontology (e.g. ontology classes) that enhances the query language; and processing resources, including at least one second processor and a memory, configured to translate (optionally at compile time) references to ontology concepts into translated queries processable by the event processing agent in accordance with the query language, without the semantic extension enhancement. In other words, in certain example embodiments, the mapping may map event types to ontology classes and, rather than translating ontology rules, references to ontology concepts embedded in the query language may be translated.

According to certain example embodiments, CEP concepts may include events, event types, and channels, and/or concepts of the ontology may include classes. Further, according to certain example embodiments, attributes of event types may be mappable to properties of classes. Still further, according to certain example embodiments, translated queries may be free from, and lack any reference to, any ontology concepts.

In certain example embodiments, an event processing agent is provided. Processing resources include at least one first processor and a memory. A first connection is provided to a channel on an event bus configured to receive a stream of events. Each said event has a predefined event type. A second connection is provided to an ontology management component. The event processing agent, in cooperation with the processing resources, is configured to execute predefined queries on events received over the first connection. Each said query conforms to a query language, and the query language is enhanced via a semantic extension corresponding to an ontology. The ontology management includes a first storage location storing mappings between concepts of the query language and concepts of the ontology that enhances the query language, and is configured to translate references to ontology concepts into translated queries processable by the event processing agent in accordance with the query language, without the semantic extension enhancement.

In certain example embodiments, a method of processing events in a complex event processing (CEP) system is provided. A stream of events is received via an event bus, with each said event having a predefined event type. It is determined, in connection with an event processing agent including at least one processor, when a particular query out of a plurality of possible queries is to be executed on an event. Each said query either initially (e.g., as defined) conforms to a CEP query language executable by the event processing agent and thus is executable by the event processing agent, or has been translated into a translated query executable via the event processing agent from an enhanced query that conforms to a version of the CEP query language that has been enriched so that semantics thereof are represented in accordance with an ontology. The particular query is executed in connection with the at least one processor of the event processing agent. In some cases, translated queries may be free from, and lack any reference to, any ontology concepts.

In certain example embodiments, there is provided a method of configuring a complex event processing (CEP) system in which a stream of events is received via an event bus. Each said event has a predefined event type. Queries that are to be executable in connection with the CEP system are received. It is determined, in connection with at least one processor, whether a received query either initially conforms to a CEP query language executable by an event processing agent, or must be translated from an enhanced query that conforms to a version of the CEP query language that has been enriched so that semantics thereof are represented in accordance with an ontology in order to render it executable via the event processing agent. When the received query must be translated, a translated query is generated from the enhanced query in accordance with mappings between concepts of the CEP system and concepts of the ontology. All queries that initially conform to the CEP query language and all translated queries are deployed for possible subsequent execution.

In certain example embodiments, there is provided a non-transitory computer readable storage medium tangibly storing instructions that, when executed by at least one processor of a system, perform a method as described herein.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments improve upon current complex event processing (CEP) techniques by separating semantics from queries and allowing fast, easy, and transparent extension and change of semantics—without necessarily forcing any changes in the operative queries. Furthermore, in certain example embodiments, semantics may be explicitly modeled rather than buried in queries. In addition, semantic models that are available from external sources optionally may easily be integrated into the system. In this regard, a wide variety of ontologies is available via the Internet including, for example, the Semantic Web for Earth and Environmental Terminology (SWEET), the Open Biological and Biomedical Ontologies, and the OnTour Ontology.

An example implementation is provided below. A typical language for ontologies is OWL and, in the description that follows, an OWL-like RDF notation is used for illustrative purposes. However, it will be appreciated that any suitable ontology notation can be used in connection with embodiments of the techniques disclosed herein.

Figure 1:
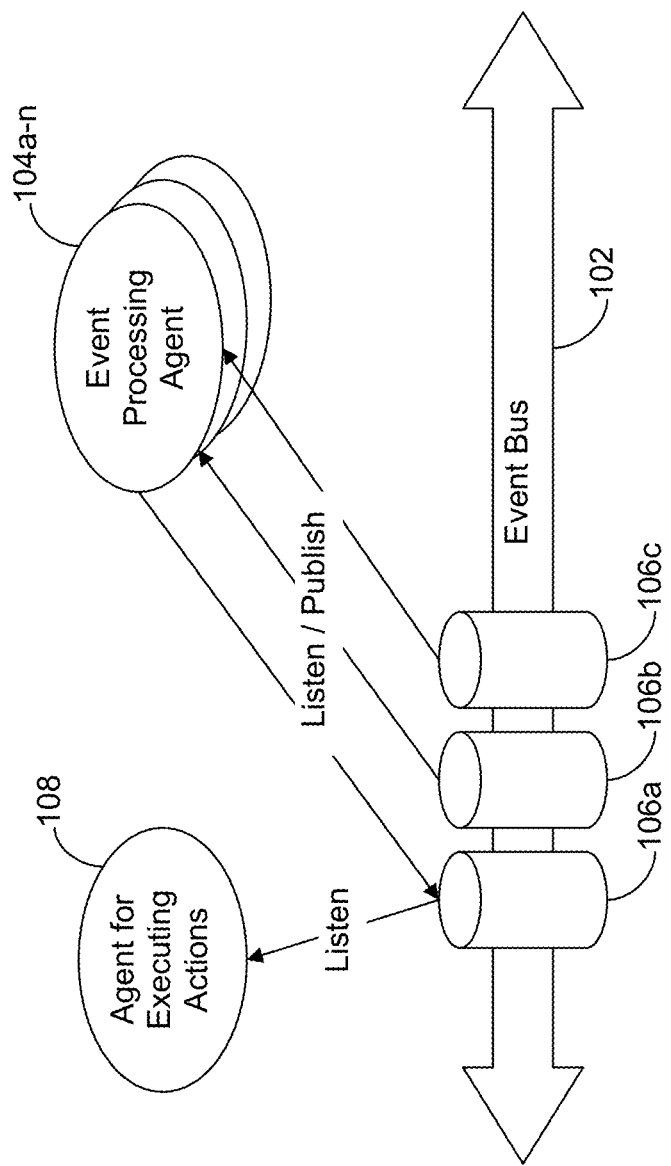
FIG. 1 is a simplified schematic view of a typical complex event processing (CEP) system and its environments.
Figure 2:
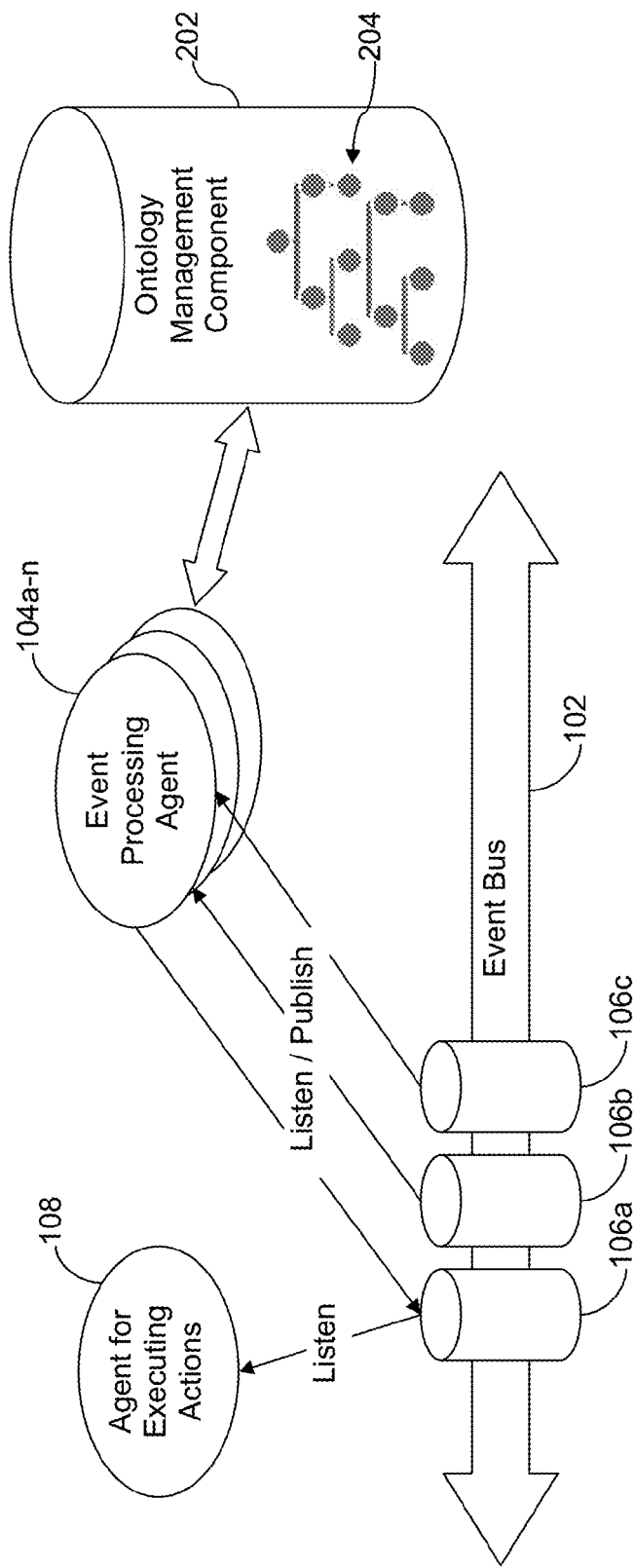
FIG. 2 is a simplified schematic view of a CEP system and its environments, in accordance with certain example embodiments.

FIG. 2 is a simplified schematic view of a CEP system and its environments, in accordance with certain example embodiments. FIG. 2 is similar to FIG. 1. However, the FIG. 2 example system is enhanced by an ontology management component 202 that allows storing, retrieval, and manipulation of one or more ontologies 204. In the ontology management component 202, ontologies 204 relating to the application area of the complex event processing system (CEP) can be managed. For example, if the CEP is used to monitor a production system, ontologies pertaining to production systems, their properties, operation conditions, general rules and regulations, and/or the like, can be stored in the ontology management component 202. These ontologies 204 could be created using interfaces of the ontology management component 202, imported from external sources, etc.

The CEP query language is enhanced by a semantic extension. In a simple case, an extension may be a "class" expression, e.g., providing all events that belong to the specified class in one of the ontologies 204 managed in the ontology management component 202. Consider the following two example queries:

```
(Q1) SELECT 'StopProduction' FROM class(#criticalEvent);
(Q2) SELECT 'RequestMaintenance', machine FROM
    (SELECT COUNT(a.x) AS number, machine
    FROM (class(#warning))
    WINDOW(RANGE 1 HOUR)
    GROUP BY machine)
    WHERE number > 5;
```

With such an expression, semantics can be modeled in an appropriate fashion (in an ontology) while processing semantics is expressed in CEP queries. Also, inference mechanisms provided on ontologies can be used. For example, it can be seen that query Q2 also relates to all events that are instances of sub-classes of "#warning".

While such a mechanism provides a clean separation of semantics and processing, some extensions to the CEP system may be made to enable this functionality. For example, the concepts in the ontology may be related to the concepts in the CEP system including, for example, events, event types, and channels. For this purpose, event types and channels can be referred to in definitions in the ontology, and this activity can be thought of as establishing a mapping. Mapping typically will be performed at design time. These CEP concepts can be mapped to one or more other concepts (e.g., classes) in at least one of the ontologies, as shown in the following example. The mapping may be expressed, for example, by declaring a class to be sub-class of "CEPEventType". The label may then indicate the corresponding event type name in the CEP. The example that follows uses an OWL representation to illustrate the mapping of CEP event type MachineEvent to the owl:class #machineevent. It further shows the declaration of a subset of all machine events (those whose event type is SystemReset) as being warnings. The example mapping is as follows:

```
<owl:Class rdf:about="#machineevent">
    <rdfs:label>MachineEvent</rdfs:label>
    <rdfs:comment>mapped to CEP event type
    MachineEvent</rdfs:comment >
    <rdfs:subClassOf><owl:Class
    rdf:about="#CEPEventType"/></rdfs:subClassOf>
</owl:Class>
<owl:Class rdf:about="#resetwarning">
    <rdfs:label>resetWarning</rdfs:label>
    <rdfs:comment>all system resets are considered
    warnings</rdfs:comment>
    <rdfs:subClassOf><owl:Class
    rdf:about="#warning"/></rdfs:subClassOf>
    <rdfs:subClassOf><owl:Class
    rdf:about="#machineevent"/></rdfs:subClassOf>
    <rdfs:subClassOf>
        <owl:Restriction>
            <owl:onProperty rdf:resource="#eventtype"/>
            <owl:allValuesFrom>SystemReset</owl:allValuesFrom>
        </owl:Restriction>
    </rdfs:subClassOf>
</owl:Class>
```

Note that ontology classes can have properties, and event types can have attributes. This advantageously allows attributes of both worlds to be mapped to each other. One possible way to express this using OWL is as follows:

```
<owl:ObjectProperty rdf:about="#eventtype">
    <rdfs:label>eventtype</rdfs:label>
    <rdfs:comment>eventtype is a property of machineevent
    </rdfs:comment>
    <rdfs:subPropertyOf rdf:resource="#CEPAttribute"/>
    <rdfs:domain><owl:Class
    rdf:about="#machineevent"/></rdfs:domain>
</owl:ObjectProperty>
<owl:ObjectProperty rdf:about="#machine">
    <rdfs:label>machine </rdfs:label>
    <rdfs:comment>machine is a property of #machineevent and of
    #machinestate</rdfs:comment>
    <rdfs:subPropertyOf rdf:resource="#CEPAttribute"/>
    <rdfs:domain>
        <owl:unionOf >
            <owl:Class rdf:about="#machineevent"/>
            <owl:Class rdf:about="#machinestate"/>
        </owl:unionOf>
    </rdfs:domain>
</owl:ObjectProperty>
```

With such a mapping, events of a certain event type are considered instances of the corresponding ontology classes this type is mapped to, and events communicated via a certain channel are also considered instances of the corresponding ontology class the channel is mapped to. Of course, the usual ontology reasoning applies, e.g., such events are also instances of the corresponding superclasses. This is why the class #warning includes all instances of #resetwarning as well as the instances of #temperaturewarning and #oilwarning that would be defined analogously as being sub-classes of #machinestate.

Figure 3:
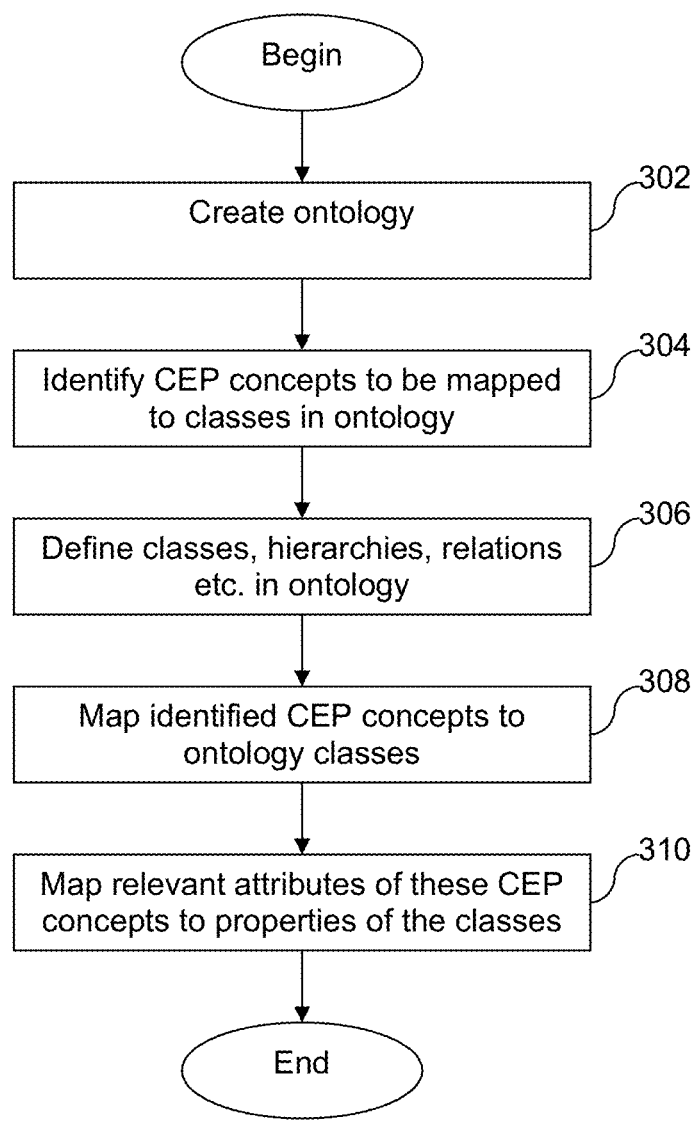
FIG. 3 is a flowchart showing an illustrative process for relating the concepts in the ontology to the concepts in the CEP system, in accordance with certain example embodiments.

FIG. 3 is a flowchart showing an illustrative process for relating the concepts in the ontology to the concepts in the CEP system, in accordance with certain example embodiments. As shown in FIG. 3, an ontology is created (e.g., user-created, imported, imported and modified, etc.), in step 302. CEP concepts (e.g., events, event types, channels, etc.) that are to be mapped to classes and/or other structures in the ontology are identified in step 304. The class hierarchies and/or other structures in the ontology are defined in step 306. In step 308, identified CEP concepts are mapped to classes. This may be accomplished with the aid of a user interface of a tool operating on a suitably configured computer system or the like, and may be graphical and/or text-based. In step 310, relevant attributes of these CEP concepts may be mapped to properties of the respective class or other structure. Again, this may be accomplished with the aid of a user interface of a tool operating on a suitably configured computer system or the like. It is noted that the example steps described in connection with FIG. 3 need not necessarily be implemented in the order shown. For instance, some or all ontology elements may be defined before some or all CEP concepts are identified, at least some attributes of the CEP concept may be mapped to properties of the ontology's elements prior to all CEP concept to ontology element mappings being completed, etc. Similarly, mappings may be made in either direction, as appropriate.

It is not reasonable in all circumstances to expect that for each event, full ontology reasoning is performed, as this might not match the performance requirements of a CEP system. Thus, when the CEP system compiles a query (e.g., at compile time), it may translate the references to ontology concepts into terms of the CEP system, resulting in possibly quite complex, but automatically generated queries. Consider, for example, query Q2 as shown above.

Query Q2 may be translated in several steps. An example first step may include enhancing class (#Warning) by its sub-classes, recursively, until classes mapped to event types are in place. It will be appreciated that unless the extension of the classifying event instances described below is implemented, it is possible that there will be no instances of ontology classes other than those created by a mapping. Thus, it might be deemed acceptable to replace the classes not having a mapping by their sub-classes. In the presence of real instances (e.g., not created by the mapping but, for example, by the mechanism described further below), the OWL classes may have to be kept in addition to their sub-classes. A corresponding example first transformation step may be as follows:

```
(Q2.1) SELECT 'RequestMaintenance', machine FROM
    (SELECT COUNT(a.x) AS number, machine
    FROM (class(#resetwarning) UNION class (#temperaturewarning)
        UNION class(#oilwarning))
    WINDOW(RANGE 1 HOUR)
    GROUP BY machine)
WHERE number > 5;
```

An example second transformation step may replace classes that are mapped to event types by SELECT sub-clauses that reflect the ontology definition. For example, class (#resetwarning) may be replaced by (SELECT <attributes> FROM MachineEvent WHERE eventtype='SystemReset'). A corresponding example second transformation step may be as follows:

```
(Q2.2) SELECT 'RequestMaintenance', machine FROM
    (SELECT COUNT(a.x) AS number, machine
    FROM ((SELECT machine FROM MachineEvent WHERE
        eventtype='SystemReset') UNION (SELECT machine
        FROM MachineState WHERE temperature>100)
        UNION(SELECT machine FROM MachineState WHERE
        oilpressure < 10))
    WINDOW(RANGE 1 HOUR)
    GROUP BY machine)
WHERE number > 5;
```

It will be appreciated that the last transformation step may use inference logic to infer that the attribute machine is needed from State and from MachineEvent. This information can in some instances be inferred from the SELECT clause of the query that, besides the aggregation function, includes only the attribute machine.

Of course, several reactions are possible if, during such a transformation step, it is determined that not all sub-classes provide such an attribute. Possible reactions may include, for example ignoring the sub-classes that do not have this attribute, matching these to all possible (e.g., occurring) values of machine, raising an error, etc.

It also will be appreciated that the resulting query that is generated by the steps described above at compile time may no longer include or reference any ontology concept. Thus, it may not be necessary to implement any changes to the runtime of the CEP engine in order for such a query to be handled.

As these queries reflect the state of the ontology at the time of query compilation, the ontology management component may inform the CEP system of every relevant change to one of its ontologies. The CEP system may then recompile and redeploy the affected queries in order to reflect the most recent state of the ontologies. In order to reduce the number of queries to be recompiled, the queries may be modeled in the ontologies as well. This may be performed by the CEP system as part of query compilation. The ontology manager can use reasoning based on the ontologies to identify the queries that have to be recompiled on a change in the ontologies and can pass this information to the CEP system.

Figure 4:
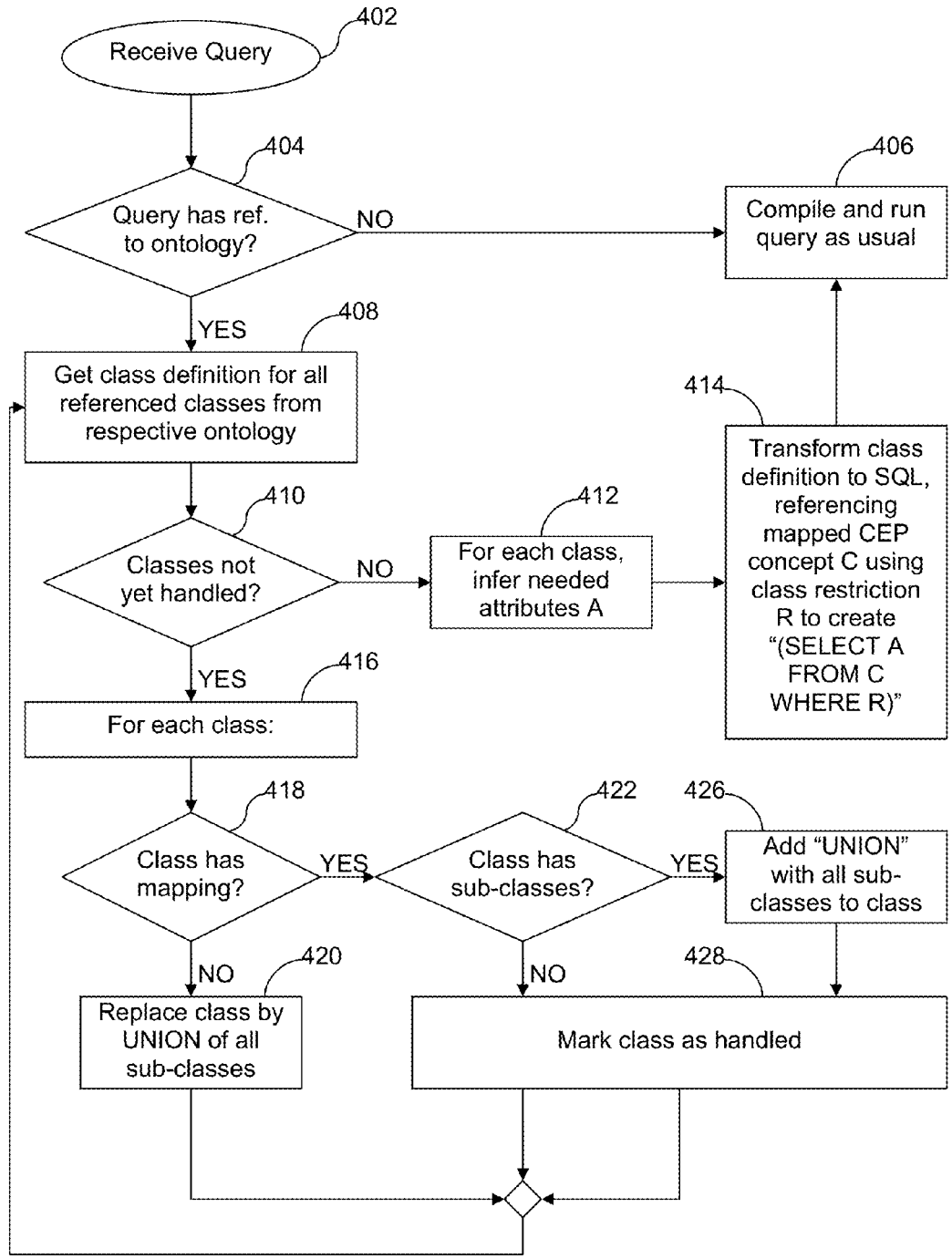
FIG. 4 is a flowchart showing an illustrative process for how a query may be evaluated by a CEP system, in accordance with certain example embodiments.

FIG. 4 is a flowchart showing an illustrative process for how a query may be evaluated by a CEP system, in accordance with certain example embodiments. As will be appreciated, FIG. 4 shows the logical steps to be performed and does not imply any particular implementation method. Indeed, many forms of performance optimization may be practiced in connection with example embodiments that implement the FIG. 4 process and, for example, in connection with some or all of the example logical steps shown therein.

As shown in FIG. 4, a query is received in step 402. If the query does not include a reference to an ontology as determined by step 404, then the query is compiled and/or run as usual in step 406. However, if the query does in fact include a reference to an ontology, the class definition for all referenced classes are retrieved from the respective ontology or ontologies in step 408.

A determination is then made as to whether the classes are not yet marked as handled in step 410. If the result of this determination is "no," then in step 412, for each class, the needed attributes A are inferred, and the class definition is transformed into one or more SQL statements, referencing mapped CEP concept C using class restriction R in step 414. As shown in FIG. 4, the SQL statement may essentially be (SELECT A FROM C WHERE R). After this transformation, the query is compiled and/or run as usual in step 406.

On the other hand, if the determination in step 410 indicates that the classes are not yet marked as handled, then the recursive process described above is triggered. That is, a recursive loop is initiated at step 416 for each class. If a class does not have a mapping as determined by step 418, then the class is replaced by the union of all its sub-classes in step 420, and the process returns to step 408. If step 418 determines that the class does have a mapping, then step 422 determines whether the class has any sub-classes. If the class does not have any sub-classes, then the class is marked as handled in step 428, and the process returns to step 408. However, if step 422 determines that the class does have sub-classes, then the union of all sub-classes is added to the class in step 426, the class is marked as handled in step 428, and the process returns to step 408. It will be appreciated that this loop will continue until all classes are marked as handled (e.g., as effectively determined in step 410).

As an example extension to the mechanism described above, in certain example embodiments, single events can be classified as being instances of ontology classes, e.g., by an external mechanism or by an explicit construction in the CEP engine. Consider, for example, the following example query:

```
(Q3) SELECT classification.#warning, machine, powerconsumption
FROM MachineState, Machines
WHERE MachineState.machine = Machines.machine AND machine.type
= 'LOWPOWER' AND MachineState.powerconsumption > 250
```

Query Q3 explicitly adds a classification to each qualifying event and could be used, for example, to force transient modifications to the system.

As another example, in certain scenarios, a human might identify that a certain event indicates a critical situation, although no CEP query exists that reflects this fact. The human could classify the event as belonging to class #criticalEvent, e.g., by using a graphical user interface or other suitable input mechanism. Each CEP query working on critical events (e.g., query Q1 discussed above) would consider this event.

To cover this example extension, events may in certain example embodiments carry ontology mapping information in their headers, as in the following example:

```
<MachineState>
    <header valid-from="20120511:10:59:00"
    valid-to="20120511:11:00:00"
    class="#warning"/>
    <payload>
        <temperature>165</temperature>
        <oilpressure>7</oilpressure>
        <powerconsumption>300</powerconsumption>
        <state>running</state>
    </payload>
</MachineState>
```

To cover this extension, the transformation described above may be enhanced, e.g., to include event instances that are classified this way. This may be done by transforming references to ontology classes such as class (#temperaturewarning) to not just one SELECT sub-clause as shown above, but to a union of this SELECT clause with a SELECT clause referring to the explicit classification.

In the example, class(#resetwarning) may be replaced by a query fragment such as, for example:

```
SELECT <attributes> FROM MachineEvent WHERE
eventtype='SystemReset')UNION (SELECT <attributes> FROM
<union of all event types> WHERE classification.#warning.
```

In addition, such SELECT clauses may be created for all classes, not just for those mapped to event types.

Although certain example embodiments have been described in connection with an SQL-like language, it will be appreciated that this language is merely an example that does not necessarily correspond to any query language that is used (or is to be used) in a real system or all embodiments of this invention. Instead, it will be appreciated that the example techniques described herein are not dependent on any specific query language and may work with any query language for CEP.

The "Event Processing Glossary" from the Event-Processing Technical Society (EP-TS) may be used to help understand certain terms used herein. However, the scope of the claims should not be considered limited by the definitions provided in this glossary, unless specifically stated.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. It also will be appreciated that the techniques described herein may be accomplished by having a processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An event processing system, comprising:
    an event bus configured to receive a stream of events, each said event having a predefined event type;
    an event processing agent including at least one first processor, the event processing agent being configured to execute predefined queries on the events, each said query conforming to a query language, the query language being enhanced via a semantic extension corresponding to an ontology; and
    an ontology management component in communication with the event processing agent, the ontology management component including:
        a first storage location storing mappings between concepts of the query language and concepts of the ontology that enhances the query language, and
        processing resources, including at least one second processor and a memory, configured to, when an enhanced query, defined in accordance with the query language enhanced via the semantic extension and to be executed on a received event by the event processing agent, includes references to ontology concepts using semantics extension enhancement in the enhanced query, generate, in accordance with the stored mapping between the concepts of the query language and the concepts of the ontology that enhances the query language, a translated query with the references to the ontology concepts in the enhanced query being translated into queries processable by the event processing agent in accordance with the query language without the semantic extension enhancement;

wherein the concepts of the ontology are classes, and wherein the generating of the translated query comprises, for the enhanced query:

retrieving a class definition for all referenced classes from a corresponding ontology;

determining whether the referenced classes are marked as being handled;

when the referenced classes are marked as being handled, transforming the respective class definition to the query language, and compiling the translated query; and when the referenced classes are not marked as being handled:
when the respective class does not have a corresponding mapping, replacing the class with a union of all of its sub-classes,
when the respective class has a corresponding mapping but no sub-classes, removing the reference to the class, and
when the respective class has a corresponding mapping and any sub-classes, adding a union with all sub-classes to the class and marking the class as handled.

2. The system of claim 1, wherein the ontology management component further comprises a second storage location storing the ontology that enhances the query language.

3. The system of claim 1, wherein the processing resources translate only a partial subset of possible references to ontology concepts into translated queries processable by the event processing agent in accordance with the query language, without the semantic extension enhancement.

4. The system of claim 1, wherein the processing resources are configured to create translations at compile time.

5. The system of claim 1, wherein the concepts of the query language include events, event types, and channels.

6. The system of claim 1, wherein attributes of event types are mappable to properties of classes.

7. The system of claim 1, wherein events of a certain event type are considered instances of corresponding ontology class(es) to which that certain event type is mapped, and/or events communicated via a certain channel are considered instances of corresponding ontology class(es) to which that certain channel is mapped.

8. The system of claim 1, wherein events of a certain event type are considered instances of any superclass(es) to which the corresponding ontology class(es) to which that certain event type is mapped belong.

9. The system of claim 1, wherein a user interface is configured to accept, at design time, input specifying mappings.

10. The system of claim 1, wherein translated queries are free from, and lack any reference to, any ontology concepts.

11. The system of claim 1, wherein individual events are classifiable as being instances of a corresponding ontology class.

12. The system of claim 1, wherein the events comprise respective headers and payloads, and wherein at least some of the events include, in their headers, ontology mapping information.

13. The system of claim 1, wherein the ontology management component is further configured to determine when an ontology has changed and, in response, recompile and redeploy affected queries in order to reflect a most recent state of the changed ontology.

14. The system of claim 1, wherein the semantic extension defines a class expression including events that belong to a class of the ontology.

15. The system of claim 1, wherein the ontology management component is further configured to determine when an ontology has changed and, in response, recompile and redeploy affected queries in order to reflect a most recent state of the changed ontology, without changing the query language.

16. An event processing agent, comprising:
processing resources including at least one first processor and a memory;
a first connection to a channel on an event bus configured to receive a stream of events, each said event having a predefined event type; and
a second connection to an ontology management component;
wherein the event processing agent, in cooperation with the processing resources, is configured to execute predefined queries on events received over the first connection, each said query conforming to a query language, the query language being enhanced via a semantic extension corresponding to an ontology;
wherein the ontology management includes a first storage location storing mappings between concepts of the query language and concepts of the ontology that enhances the query language, and is configured to, when an enhanced query, defined in accordance with the query language enhanced via the semantic extension and to be executed on a received event by the event processing agent includes references to ontology concepts using semantics extension enhancement in the enhanced query, generate, in accordance with the stored mapping between the concepts of the query language and the concepts of the ontology that enhances the query language, a translated query with the references to the ontology concepts in the enhanced query being translated into queries processable by the event processing agent in accordance with the query language without the semantic extension enhancement; and
wherein the concepts of the ontology are classes, and wherein the generating of the translated query comprises, for the enhanced query:
retrieving a class definition for all referenced classes from a corresponding ontology;
determining whether the referenced classes are marked as being handled;
when the referenced classes are marked as being handled, transforming the respective class definition to the query language, and compiling the translated query; and
when the referenced classes are not marked as being handled:
when the respective class does not have a corresponding mapping, replacing the class with a union of all of its sub-classes;
when the respective class has a corresponding mapping but no sub-classes, removing the reference to the class; and
when the respective class has a corresponding mapping and any sub-classes, adding a union with all sub-classes to the class and marking the class as handled.

17. The agent of claim 16, wherein the concepts of the query language include events, event types, and channels.

18. The agent of claim 16, wherein attributes of event types are mappable to properties of classes.

19. The agent of claim 16, wherein events of a certain event type are considered instances of corresponding ontology class(es) to which that certain event type is mapped, and/or events communicated via a certain channel are considered instances of corresponding ontology class(es) to which that certain channel is mapped.

20. The agent of claim 16, wherein events of a certain event type are considered instances of any superclass(es) to which the corresponding ontology class(es) to which that certain event type is mapped belong.

21. The agent of claim 16, wherein translated queries are free from, and lack any reference to, any ontology concepts.

22. A method of processing events in a complex event processing (CEP) system, the method comprising:
receiving, via an event bus, a stream of events, each said event having a predefined event type;
determining, in connection with an event processing agent including at least one processor, when a particular query out of a plurality of possible queries is to be executed on an event received via the event bus, each said query either initially conforming to a CEP query language executable by the event processing agent and thus being executable by the event processing agent, or being translated into a translated query executable via the event processing agent from an enhanced query that conforms to a version of the CEP query language that has been enriched so that semantics thereof are represented in accordance with an ontology, wherein the particular query to be executed on the event received via the event bus is translated, in accordance with a stored mapping between elements of the CEP query language and elements of the ontology that enhances the query language, from an enhanced query including references to ontology elements into a translated query executable via the event processing agent, the references to the ontology elements in the enhanced query being translated into queries processable by the event processing agent in accordance with the query language; and
executing the particular query in connection with the at least one processor of the event processing agent;
wherein a first data store stores the mappings between elements of the CEP query language, and the elements of the ontology;
wherein translated queries are generated in accordance with the mappings stored in the first data store; and
wherein the concepts of the ontology are classes, and wherein the generating of the translated query comprises, for the enhanced query:
retrieving a class definition for all referenced classes from a corresponding ontology;
determining whether the referenced classes are marked as being handled;
when the referenced classes are marked as being handled, transforming the respective class definition to the query language, and compiling the translated query; and
when the referenced classes are not marked as being handled:
when the respective class does not have a corresponding mapping, replacing the class with a union of all of its sub-classes;
when the respective class has a corresponding mapping but no sub-classes, removing the reference to the class; and
when the respective class has a corresponding mapping and any sub-classes, adding a union with all sub-classes to the class and marking the class as handled.

23. The method of claim 22, wherein translated queries are generated at compile time.

24. A non-transitory computer readable storage medium tangibly storing a program comprising instructions that, when executed, perform a method according to claim 22.

25. The method of claim 22, wherein translation of a given query includes translating references to ontology concepts that exist therein into translated queries processable by the event processing agent, without the semantic extension enhancement.

26. A method of configuring a complex event processing (CEP) system in which a stream of events is received via an event bus, each said event having a predefined event type, the method comprising:
receiving queries that are to be executable in connection with the CEP system;
determining, in connection with at least one processor, whether a received query either initially conforms to a CEP query language executable by an event processing agent, or must be translated from an enhanced query that conforms to a version of the CEP query language that has been enriched so that semantics thereof are represented in accordance with an ontology in order to render it executable via the event processing agent;
when the received query must be translated, generating a translated query from the enhanced query in accordance with mappings between concepts of the CEP system and concepts of the ontology, wherein the enhanced query includes references to ontology concepts and the references to the ontology concepts are translated into queries processable by the event processing agent in accordance with the query language; and
deploying all queries that initially conform to the CEP query language and all translated queries for possible subsequent execution;
wherein the concepts of the ontology are classes, and wherein the generating of the translated query comprises, for the enhanced query:
retrieving a class definition for all referenced classes from a corresponding ontology;
determining whether the referenced classes are marked as being handled;
when the referenced classes are marked as being handled, transforming the respective class definition to the query language, and compiling the translated query; and
when the referenced classes are not marked as being handled:
when the respective class does not have a corresponding mapping, replacing the class with a union of all of its sub-classes;
when the respective class has a corresponding mapping but no sub-classes, removing the reference to the class; and
when the respective class has a corresponding mapping and any sub-classes, adding a union with all sub-classes to the class and marking the class as handled.

27. The method of claim 26, wherein the generating of the translated queries is practiced at compile time.

28. The method of claim 26, wherein concepts of the CEP query language include events, event types, and channels, and/or concepts of the ontology include classes.

29. The method of claim 26, wherein attributes of event types are mappable to properties of classes.

30. The method of claim 26, wherein events of a certain event type are considered instances of corresponding ontology class(es) to which that certain event type is mapped; events communicated via a certain channel are considered instances of corresponding ontology class(es) to which that certain channel is mapped; and/or events of a certain event type are considered instances of any superclass(es) to which the corresponding ontology class(es) to which that certain event type is mapped belong.

31. The method of claim 26, further comprising receiving, via a user interface, user input identifying at least some of the mappings.

32. The method of claim 31, wherein the user input identifying the mappings is received at design time.

33. The method of claim 26, wherein the translated queries are free from, and lack any reference to, any ontology concepts.

34. The method of claim 26, further comprising detecting when an ontology has changed and, in response, to a detection of a change, recompiling and redeploying any affected enriched queries in order to reflect a most recent state of the changed ontology.

35. A method of configuring a complex event processing (CEP) system in which a stream of events is received via an event bus, each said event having a predefined event type, the method comprising:

receiving queries that are to be executable in connection with the CEP system;

determining, in connection with at least one processor, whether a received query either initially conforms to a CEP query language executable by an event processing agent, or must be translated from an enhanced query that conforms to a version of the CEP query language that has been enriched so that semantics thereof are represented in accordance with an ontology in order to render it executable via the event processing agent;

when the received query must be translated, generating a translated query from the enhanced query in accordance with mappings between concepts of the CEP system and concepts of the ontology, wherein the enhanced query includes references to ontology concepts and the references to the ontology concepts are translated into queries processable by the event processing agent in accordance with the query language; and deploying all queries that initially conform to the CEP query language and all translated queries for possible subsequent execution;

wherein the concepts of the ontology are classes, and wherein the generating of the translated query comprises, for the enhanced query:

(a) retrieving a class definition for all referenced classes from a corresponding ontology;

(b) determining whether the referenced classes are marked as being handled;

(c) when the referenced classes are marked as being handled:

for each class, inferring needed attributes A, transforming the respective class definition to the query language, referencing any mapped concepts of the CEP system C using class restriction R to create the translated query having a general format of "SELECT A FROM C WHERE R", and compiling the translated query; and (d) when the referenced classes are not marked as being handled, for each class:

determining whether the respective class has a corresponding mapping, when the respective class does not have a corresponding mapping, replacing the class with a union of all of its sub-classes, and returning to (a), when the respective class has a corresponding mapping, determining whether the respective class has any sub-classes, when the respective class has a corresponding mapping but no sub-classes, removing the reference to the class, and returning to (a), and when the respective class has a corresponding mapping and any sub-classes, adding a union with all sub-classes to the class, marking the class as handled, and returning to (a).

* * * * *